July 12, 1955
M. J. MERRICK
2,712,773
ADJUSTABLE OPTICAL BINOCULAR VIEWER
Filed June 17, 1952
2 Sheets-Sheet 1
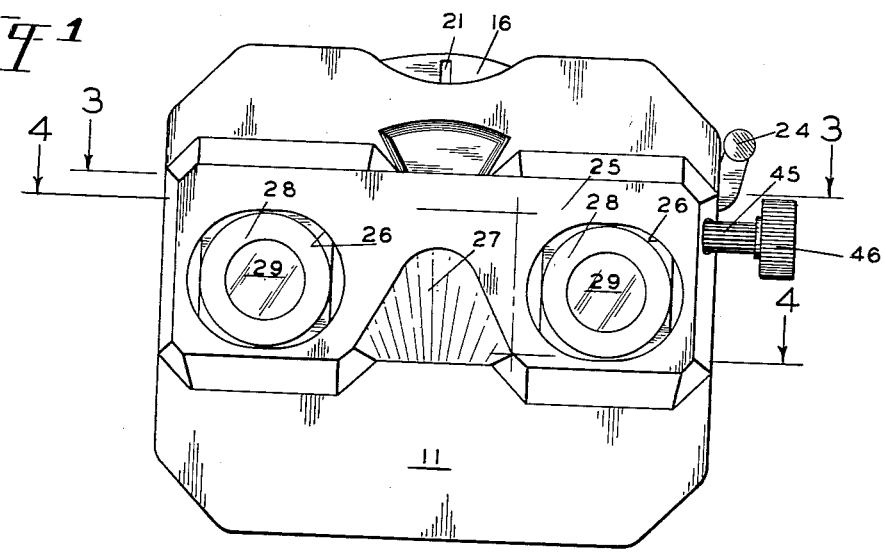
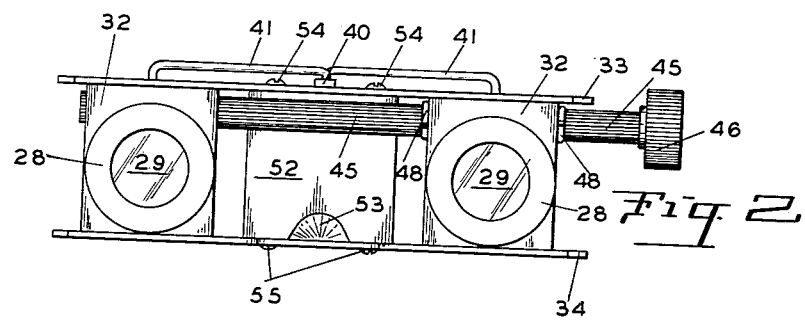
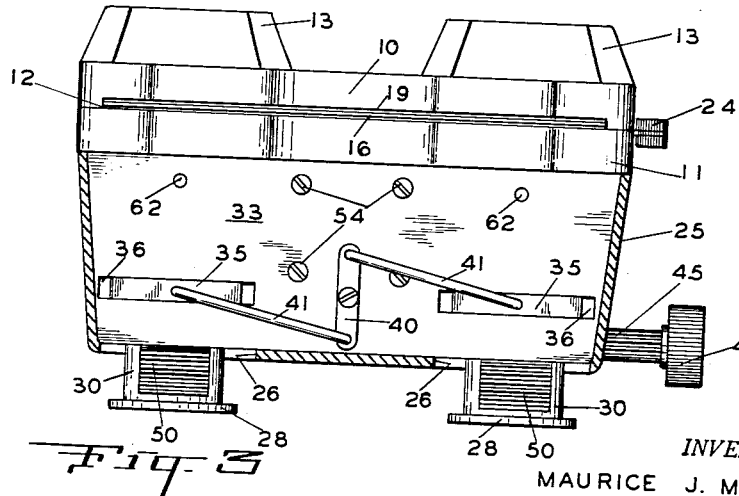
INVENTOR.
MAURICE J. MERRICK
BY
ATTORNEYS July 12, 1955
M. J. MERRICK
2,712,773
ADJUSTABLE OPTICAL BINOCULAR VIEWER
Filed June 17, 1952
2 Sheets-Sheet 2
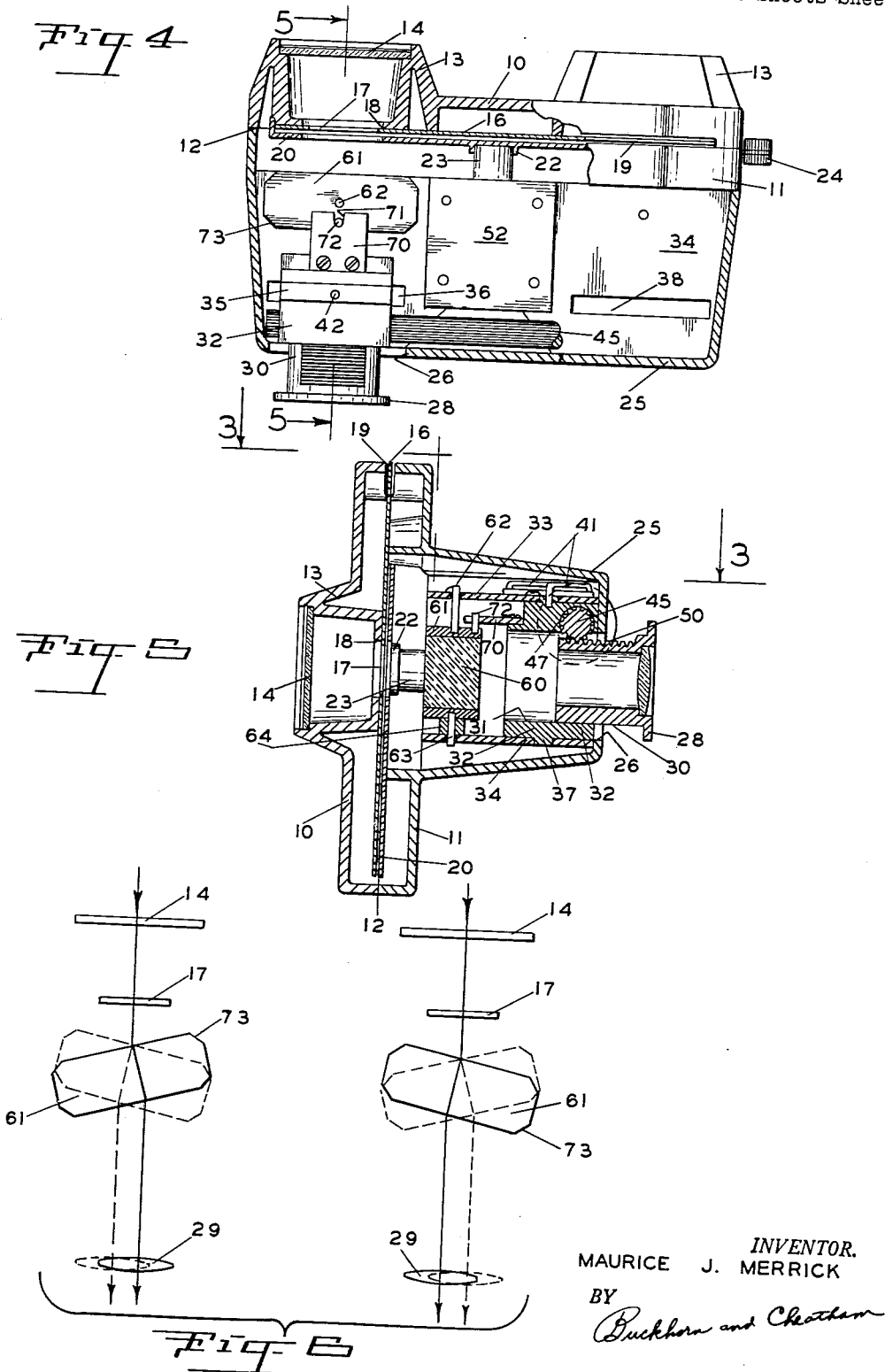
INVENTOR.
MAURICE J. MERRICK
BY
Buckhorn and Cheatham
ATTORNEYS

United States Patent Office 2,712,773
Patented July 12, 1955

2,712,773

ADJUSTABLE OPTICAL BINOCULAR VIEWER

Maurice J. Merrick, Portland, Oreg., assignor to Sawyer's Inc., Portland, Oreg., a corporation of Oregon Application June 17, 1952, Serial No. 293,991

8 Claims. (Cl. 88—29)

My present invention relates to optical instruments employing two optical axes which are parallel to one another, in which instrument it is desired to incorporate an adjustment by means of which the lateral separation of the two axes may be increased or decreased without in any way altering the final disposition of any images or groups of light patterns being carried along the two axes. In this broad sense the invention is applicable in stereoscopic viewers, cameras, projectors, or any other device in which such an adjustment may be desirable. Primarily, the present invention is intended for stereoscopic use in any of the above specifically named devices.

While the invention is applicable in this broad sense, it is specifically illustrated in a stereoscopic viewer, more specifically a viewer for viewing stereoscopic transparencies mounted in holders, in which the centers of the transparencies are separated by a distance equal to the average human interpupillary distance. In this respect, the present invention comprises an improvement upon the stereoscopic viewer illustrated, described and claimed in the patent to Gruber, No. 2,511,334, issued June 13, 1950. Accordingly, the principal purpose of the present invention is to provide means whereby perfect stereoscopic viewing may be accomplished by any user of a viewer of the type disclosed in the Gruber patent.

The principal object of the present invention is achieved by providing means whereby the pairs of images transmitted to the eyes of the observer may be optically moved apart or together in their own plane and without distortion until perfect alignment with the eyes of the observer is realized. The present invention, therefore, makes perfect stereoscopic viewing possible by achieving the same effect as though the centers of the eyes of the observer were displaced so as to be separated by exactly the same distance as the infinity points of the stereoscopic pair of transparencies.

A further object of the present invention is to provide means for accomplishing the foregoing principal object, which are simple and unique and which accomplish a function which has heretofore been considered practically impossible.

The objects and advantages of the present invention may be more thoroughly understood by reference to the accompanying drawings taken in connection with the following specification wherein like numerals refer to like parts throughout.

In the drawings,

Fig. 1 is a front view of a stereoscopic viewer incorporating the present invention;

Fig. 2 is a front view of the eyepiece apparatus separated from the viewer;

Fig. 3 is a top view of the viewer with a portion thereof broken away substantially on line 3—3 of Fig. 1 and line 3—3 of Fig. 5;

Fig. 4 is a top view of the viewer with portions thereof broken away substantially along line 4—4 of Fig. 1;

Fig. 5 is a vertical section taken substantially along line 5—5 of Fig. 4; and

Fig. 6 is a schematic plan view of the optical elements of the viewer.

The viewer comprises a pair of molded casing parts, a rear part 10, and a front part 11, the two parts being complementary along a viewing plane indicated at 12 and being suitably fastened together. The rear part 10 is provided with a pair of hollow projections 13, in the forward end of each of which there is mounted a frosted glass pane 14. Portions of the rear part 10 terminate along the viewing plane 12 to provide support for one surface of a view holding disc 16 in which are mounted stereoscopic pairs of transparencies 17. The inner end of each of the projections 13 is provided with an opening 18 to permit diffused light to pass through the transparencies 17 when the viewer is directed toward a source of light. The discs 16 may be inserted and removed through a slot 19 in the upper surface of the viewer. The surface of the disc toward the observer rests upon portions of the front part 11 and of a feeding lever plate 20 which is provided with means (not shown) to engage a series of perforations 21 in the edge of the disc. The plate 20 is provided with a centrally located flange 22 which surrounds the forwardly projecting end of a pivot 23 projecting from a fixed portion of the apparatus, and the feeding plate 20 is provided with a lever portion which projects outwardly through a slot in the side of the viewer and is provided with a knob 24 whereby the plate may be angularly displaced a limited amount. The plate is provided with projections (not shown) for engagement with the apertures 21 in the view holding disc 16, whereby various pairs of views may be positioned in alignment with the openings 18. Further details of the apparatus as so far described may be ascertained from the above-mentioned Gruber patent.

The front part 11 is provided with a centrally disposed projecting portion 25 having a pair of horizontally spaced openings 26 therein, the openings having oval outlines with the major axes thereof disposed along a horizontal line. The centers of the openings 26 are horizontally spaced apart an amount substantially equal to the average human interpupillary distance, and the central portion of the projecting portion 25 is provided with a concavity 27 in its lower surface, whereby the centers of the openings 26 may be brought up to the eyes of an observer with the nose of the observer being accommodated in the concavity 27. A pair of eyepieces 28 each mounting an eyepiece lens 29 are disposed in the viewer with the optical axes of the lenses directed toward the transparencies 17, whereby a magnified image of the transparency may be obtained. When the lenses 29 are centered in the openings 26, the viewer is adjusted for the average human, but the lenses may be displaced laterally to either side in order to accommodate greater or lesser than average interpupillary spacing.

The eyepieces 28 comprise tubular lens barrels 30 which are slidably mounted for longitudinal movement in cylindrical bores 31 in a pair of mounting blocks 32. The mounting blocks are slidably mounted between an upper mounting plate 33 and a parallel lower mounting plate 34, the two plates 33 and 34 being suitably retained in the casing portion 11 in grooves therein (not shown). Means for guiding the lateral movement of the eyepiece lenses are provided, the means comprising guide lands 35 extending in the lateral direction along the upper surface of the mounting blocks 32 and projecting into elongated guiding slots 36 in the upper plate 33, and similar lands 37 projecting into similar slots 38 in the lower plate 34. A reversing linkage interconnects the mounting blocks for simultaneous, coextensive movement in opposite directions, whereby the eyepiece lenses are displaced to the correct amount for proper viewing. The reversing linkage comprises a centrally located, double-arm lever 40 extending in the longitudinal direction of the viewer, the lever being pivotally mounted in alignment with the lands 35, and a link rod 41 extending from each end of the lever 40 to an opening 42 in the center of the land 35. In order that lateral displacement may be easily effected, means are provided as follows: A longitudinally fluted adjusting rod 45 extends through a side of the casing part 11, and is provided with an adjusting knob 46. The rod 45 is rotatably mounted in transverse openings 47 which extend through the mounting blocks 32 in intersecting relation with the bores 31, whereby the flutes of the rod extend into the bores. A pair of snap rings 48 are mounted in annular grooves in the rod 45, the snap rings snugly embracing one of the mounting blocks therebetween. When the rod is pushed or pulled longitudinally, the mounting block 32 embraced by the rings 48 is moved to the desired extent, and the motion is reversely transmitted to the other mounting block 32 through the reversing linkage.

In order to retain the eyepieces 28 in the bores 31, and to provide means simultaneously to adjust the spacing of the lenses 29 from the transparencies 17 for focusing purposes, a portion of the barrel 30 is provided with a longitudinally extnding flat surface in which is provided a plurality of rack teeth 50 engageable with the longitudinal flutes of the rod 45. The teeth 50 do not extend to each end of the barrel 30, so that the eyepieces cannot be displaced from the apparatus unless the rod 45 is longitudinally withdrawn, the ends of the flat portions providing stops against rotation of the rod 45 beyond certain limits. The rod 45 therefore not only serves to displace the eyepieces laterally, but also serves to displace the eyepiece lenses longitudinally for focusing purposes.

The upper and lower mounting plates 33 and 34 are maintained in rigid alignment by a central block 52 from which the pivot 23 projects, and which is provided with a depression 53 in its lower edge to accommodate the nose depression 27. The lower mounting plate 34 also has a recess therein for the purpose of accommodating the nose depression 27. The upper plate 33 is fastened to the upper surface of the block 52 by screws 54, and the lower plate 34 is fastened to the lower surface of the block 52 by screws 55. Means are thus provided for maintaining exact alignment without depending upon the molded surfaces of the facing part 11.

In order to achieve exact displacement of the lines of sight while maintaining parallelism thereof and without distortion of the optical images, there is provided a pair of optical plates 60 mounted in the interior of the instrument between the mounting blocks 32 and the windows 18. These optical plates may be clear optical glass or any suitable transparent material having a known index of refraction, the plates having a determined thickness, and having parallel front and rear surfaces. The optical plates are maintained with their parallel surfaces extending normal to the line of sight when the lenses are spaced apart the average interpupillary distance. In such position the line of sight is a continuous straight line. However, in accordance with the law of refraction, displacement of the line of sight may be effected by angularly displacing the optical plates. To achieve this function, each plate is mounted in a molded rim 61 from which projects an upper pivot 62 and an aligned lower pivot 63, the pivots lying along a centrally disposed vertical axis. The pivot 62 projects through a bearing opening in the upper plate 33 and the pivot 63 projects through a bearing opening in the lower plate 34, and the optical plate is held in proper relation to the apparatus by a spacer collar 64 surrounding the pivot 63 between the lower surface of the holder 61 and the plate 34. In order to effect simultaneous, coextensive displacement of the optical plates in opposite directions to an amount determined by the lateral displacement of the lenses, means are provided as follows: A form of scotch-yoke linkage interconnects the eyepieces with the optical plates, the linkage comprising a plate 70 mounted on the eyepiece block 32 and projecting over the optical plate. The plate 70 is provided with a slot 71 extending in the longitudinal direction of the line of sight and embracing a vertical pin 72 projecting upwardly from the holder 61 and parallel to the pivot 62 in offset relation thereto. Thus, whenever the eyepiece is displaced laterally from its central position, the optical plate is angularly displaced an amount determined as follows:

In order for the device to operate with mathematical exactness, the lenses would at any time have to be separated by an amount $S+2D$, where $S$ is the spacing of the infinity points of the transparencies, or the average interpupillary distance, and $D$ is the amount of lateral displacement of each lens, and in which $$D = t \sin \alpha - t \frac{(\cos \alpha \sin \alpha)}{\sqrt{n^2 - \sin^2 \alpha}}$$

in which formula $t$ equals the thickness of the plate, $n$ equals the index of refraction of the plate, and alpha represents the angle through which the plate is turned. It has been found that the construction of a mechanism which would generate this function is possible but not practicable in apparatus of the character disclosed in the present application. A much less complicated, less cumbersome and less expensive apparatus has been devised to approximate the desired result, which apparatus is disclosed in the accompanying drawing and the preceding description. This mechanism separates the lenses by an amount $S+2D$ where $D$ equals a constant multiplied by the tangent of the angle alpha, this constant having been empirically determined as the numeral 0.1690. A plot of a curve depicting the exactly mathematical correct formula compared with a plot of a curve depicting the approximate formula shows that the approximation recreates the exact curve to a degree closer than the errors which would be involved in the fabrication and assembly of either mechanism. The following is a table of values from which curves may be drawn, and which shows the degree of correlation between the curves. In the table, $D-1$ is the mathematically correct displacement, and $D-2$ is the approximate displacement achieved by the instant apparatus.

| Alpha (Degrees) | D−1 (Inches) | D−2 (Inches) | Difference (Inches) |
|---|---|---|---|
| 10 | .030312 | .029799 | .0005 |
| 20 | .062732 | .061511 | .0012 |
| 30 | .095500 | .097572 | .0019 |
| 40 | .143078 | .141808 | .00127 |
| 50 | .195606 | .201414 | .0058 |
| 60 | .260194 | .292724 | .0325 |

It may be seen from these figures that the curve of the approximating apparatus is very close to that of the exact apparatus for any angle of displacement up to 50°. It would be impractical to use such large displacements, most displacements in apparatus of this character being less than 20°. In the instant disclosure the maximum required displacement in either direction is accommodated, when using a one-half inch optical plate, by beveling the vertical edges of the holder 61 as indicated at 73.

The displacement of the lines of sight effected in the instant apparatus is disclosed in the schematic drawing Fig. 6, wherein the unbroken directional lines represent the lines of sight when the lenses are displaced toward each other, and the broken directional lines represent the lines of sight when the lenses are displaced away from each other.

Having illustrated and described a preferred embodiment of my invention, it should be apparent to those skilled in the art that the same permits of modification in arrangement and detail. I claim as my invention all such modifications as come within the true spirit and scope of the appended claims.

I claim:

1. A viewer for stereo-paired transparencies so mounted in holders that the centers of the transparencies are spaced apart by an amount substantially equal to the average interpupillary distance, comprising means to maintain a transparency holder in a vertical plane with the pair of transparencies at opposite sides thereof centered along a horizontal line, a pair of viewing eyepieces having lenses therein and adapted to be held in front of the eyes for viewing the transparencies, means guiding said eyepieces for horizontal displacement to positions of greater or lesser than average eye spacing, means effective simultaneously and coextensively to move said eyepieces along said guiding means in opposite directions, a pair of optical plates mounted in the lines of sight between said eyepiece lenses and said transparencies, vertical pivot means supporting each of said optical plates, and means linking each eyepiece to its associated optical plate, said linking means maintaining the surfaces of said optical plates normal to the lines of sight when said eyepiece lenses have the same spacing as said transparencies and angularly displacing said optical plates coextensively and simultaneously in opposite directions to displace the lines of sight therethrough while maintaining parallelism thereof as said eyepiece lenses are shifted to adjust the spacing thereof to that of the viewer's eyes, said linking means comprising a pin, means mounting said pin on said optical plate in parallel relation to said pivot means and offset therefrom along the transverse axis of said optical plate, and a slot on said eyepiece extending longitudinally of the line of sight and into which said pin projects whereby the lineal displacement of said lenses comprises a function of the tangent of the angle of displacement of said optical plates.

2. An optical instrument comprising a pair of lenses, a member mounting each of said lenses, means guiding said members for lateral displacement transversely with respect to the optical axes of said lenses, means simultaneously and coextensively to move said members along said guiding means in opposite directions, a pair of optical plates mounted in the lines of sight through said lenses, vertical pivot means supporting each of said optical plates, and means linking each of said lens mounting members to its associated optical plate, said linking means maintaining the surfaces of said optical plates normal to the lines of sight when said lenses are at the centers of said guiding means and angularly displacing said optical plates coextensively and simultaneously in opposite directions to displace the lines of sight therethrough while maintaining parallelism thereof as said lenses are shifted, said linking means comprising a pin, means mounting said pin on said optical plate in parallel relation to said pivot means and offset therefrom along the transverse axis of said optical plate, and means providing a slot on said lens mounting member extending longitudinally of the line of sight and into which said pin projects whereby the lineal displacement of said lenses comprises a function of the tangent of the angle of displacement of said optical plates.

3. An optical instrument comprising a pair of lenses, a pair of lens barrels, each mounting one of said lenses, a pair of mounting blocks each having a bore therethrough in which one of said lens barrels is longitudinally guided, each of said lens barrels having external rack teeth thereon, means maintaining said mounting blocks with the axes of the bores therethrough in parallel alignment comprising an upper and lower plate between which said mounting blocks are slidably guided, cooperating means on said mounting blocks and said plates for guiding movement of said mounting blocks in a direction normal to the axes of said bores, transverse openings in each of said mounting blocks intersecting said bores, a fluted rod extending through said transverse openings with the flutes thereof in engagement with said rack teeth whereby simultaneous, coextensive longitudinal adjustment of said lens barrels may be effected, means on said fluted rod engaging one of said mounting blocks to prevent longitudinal movement of said rod with respect to said one mounting block, a reversing linkage mounted on one of said plates and interconnecting said mounting blocks whereby lateral displacement of one of said mounting blocks is accompanied by coextensive lateral displacement of the other of said mounting blocks in the opposite direction, a pair of optical plates disposed in the line of sight through said bores, vertical pivot means pivotally mounting each of said optical plates between said upper and lower plates, and a scotch-yoke device interconnecting each of said mounting blocks and its adjacent optical plate whereby angular displacement of said optical plates to equal extents in opposite directions to an amount determined by the lateral displacement of said mounting blocks is effected when said mounting blocks are moved.

4. An optical instrument comprising a pair of lenses, a pair of lens barrels each mounting one of said lenses, a pair of mounting blocks each having a bore therethrough in which one of said lens barrels is longitudinally guided, means maintaining said mounting blocks with the axes of the bores therethrough in parallel alignment comprising an upper and lower plate between which said mounting blocks are slidably guided, cooperating means on said mounting blocks and said plates for guiding movement of said mounting blocks in a direction normal to the axes of said bores, transverse openings in each of said mounting blocks, a rod extending through said transverse openings, means on said rod engaging one of said mounting blocks to prevent longitudinal movement of said rod with respect to said one mounting block, a reversing linkage mounted on one of said plates and interconnecting said mounting blocks whereby lateral displacement of one of said mounting blocks is accompanied by coextensive lateral displacement of the other of said mounting blocks in the opposite direction, cooperating pinion means on said rod and rack means on said lens barrels, a knob coaxially fixed to said rod and manually engageable whereby simultaneous longitudinal movement and rotation of said rod may be effected, a pair of optical plates mounted in the lines of sight through said lenses, means to maintain a transparency holder for stereo-paired transparencies in a viewing plane with the transparencies in the lines of sight through said lenses and said optical plates, vertical pivot means supporting each of said optical plates near their centers, and means linking each lens to its associated optical plate, said linking means maintaining the surfaces of said optical plates normal to the lines of sight when said lenses have the same spacing as said transparencies and angularly displacing said optical plates coextensively and simultaneously in opposite directions to displace the lines of sight therethrough while maintaining parallelism thereof as said eyepiece lenses are shifted laterally.

5. An optical instrument comprising a pair of lenses, a pair of lens barrels each mounting one of said lenses, a pair of mounting blocks each having a bore therethrough in which one of said lens barrels is longitudinally guided, each of said lens barrels having external rack teeth thereon, means maintaining said mounting blocks with the axes of the bores therethrough in parallel alignment comprising an upper and lower plate between which said mounting blocks are slidably guided, cooperating means on said mounting blocks and said plates for guiding movement of said mounting blocks in a direction normal to the axes of said bores, transverse openings in each of said mounting blocks intersecting said bores, a fluted rod extending through said transverse openings with the flutes thereof in engagement with said rack teeth whereby simultaneous, coextensive longitudinal adjustment of said lens barrels may be effected, means on said fluted rod engaging one of said mounting blocks to prevent longitudinal movement of said rod with respect to said one mounting block, a reversing linkage mounted on one of said plates and interconnecting said mounting blocks whereby lateral displacement of one of said mounting blocks is accompanied by coextensive lateral displacement of the other of said mounting blocks in the opposite direction, means to maintain a stereo-pair of transparencies in a viewing plane normal to the lines of sight through said lenses, a pair of optical plates mounted in the lines of sight through said lenses between said lenses and said transparencies, vertical pivot means supporting each of said optical plates with the axes of said pivot means intersecting the lines of sight through said lenses when the spacing of said lenses corresponds with the spacing of the infinity points of the transparencies, means linking each lens to its associated optical plate, said linking means maintaining the surfaces of said optical plates normal to the lines of sight when the optical centers of said lenses have the same spacing as the infinity points of said transparencies and angularly displacing said optical plates coextensively and simultaneously in opposite directions to displace the lines of sight therethrough while maintaining parallelism thereof as said lenses are shifted laterally, an end of said fluted rod projecting from said instrument, and manually engageable means on said rod end whereby simultaneous rotation and longitudinal movement of said rod may be manually effected.

6. An optical instrument comprising a pair of lenses, a pair of lens barrels each mounting one of said lenses, a pair of mounting blocks each having a bore therethrough in which one of said lens barrels is longitudinally guided, means maintaining said mounting blocks with the axes of the bores therethrough in parallel alignment comprising an upper and lower plate between which said mounting blocks are slidably guided, cooperating means on said mounting blocks and said plates for guiding movement of said mounting blocks in a direction normal to the axes of said bores, means for laterally displacing one of said mounting blocks, a reversing linkage mounted on one of said plates and interconnecting said mounting blocks whereby lateral displacement of said one mounting block is accompanied by coextensive lateral displacement of the other of said mounting blocks in the opposite direction, a pair of optical plates disposed in the line of sight through said bores, vertical pivot means pivotally mounting each of said optical plates between said upper and lower plates, and a scotch-yoke device interconnecting each of said mounting blocks and its adjacent optical plate whereby angular displacement of said optical plates to equal extents in opposite directions to an amount determined by the lateral displacement of said mounting blocks is effected when said mounting blocks are moved.

7. An optical instrument comprising a pair of lenses, a pair of mounting blocks each mounting one of said lenses, guide means maintaining said mounting blocks with the optical axes of said lenses in parallel alignment, cooperating means on said mounting blocks and said guide means for guiding movement of said mounting blocks in a direction normal to the optical axes of said lenses, means laterally to displace one of said mounting blocks, a reversing linkage mounted on said guide means and interconnecting said mounting blocks whereby lateral displacement of one of said mounting blocks is accompanied by coextensive lateral displacement of the other of said mounting blocks in the opposite direction, a pair of optical plates disposed in the line of sight through said lenses, vertical pivot means pivotally mounting each of said optical plates, and a scotch-yoke device interconnecting each of said mounting blocks and its adjacent optical plate whereby angular displacement of said optical plates to equal extents in opposite directions to an amount determined by the lateral displacement of said mounting blocks is effected when said mounting blocks are moved.

8. A stereoscopic viewer comprising a pair of lenses, a pair of lens mounting members each mounting one of said lenses, a pair of mounting blocks each having a bore therethrough in which one of said lens mounting members is guided for movement along the line of sight therethrough for focusing purposes, a rod rotatably journaled in said mounting blocks and extending transversely with respect to said lens mounting members, pinion means on said rod, and cooperatively engaged rack teeth on each of said lens mounting members whereby rotation of said rod effects simultaneous focusing adjustment of said lenses, means slidably guiding said mounting blocks for movement transverse to the lines of sight through said lenses, means fixing said rod longitudinally with respect to one of said mounting blocks, means slidably guiding said rod longitudinally with respect to the other of said mounting blocks, a reversing linkage interconnecting said lens mounting blocks whereby longitudinal movement of said rod effects simultaneous and coextensive lateral movement of said mounting blocks and lenses in opposite directions whereby the spacing of said lenses may be adjusted to accommodate various eye spacing, means to maintain a pair of stereo-paired transparencies having their infinity points spaced apart corresponding to the average human interpupillary distance in a viewing plane with the transparencies in the lines of sight through said lenses, a pair of optical plates disposed in the lines of sight through said lenses between said lens mounting members and said transparency mounting means, vertical pivot means pivotally mounting each of said optical plates with the axes of said pivot means intersecting the lines of sight through said lenses when the spacing of said lenses corresponds to the average human interpupillary spacing, and means interconnecting each of said mounting blocks and the adjacent optical plates to equal extents in opposite directions to an amount determined by the lateral displacement of said mounting blocks is effected when said mounting blocks are moved.

References Cited in the file of this patent

UNITED STATES PATENTS

| 2,484,591 | Rochwite | Oct. 11, 1949 |

FOREIGN PATENTS

| 689,780 | France | June 2, 1930 |
| 483,471 | Germany | Oct. 1, 1929 |
| 32,312 | Switzerland | Dec. 27, 1904 |